Nov. 24, 1942.  P. E. HAWKINSON  2,303,164
PNEUMATIC TIRE
Filed Jan. 30, 1941    2 Sheets-Sheet 1
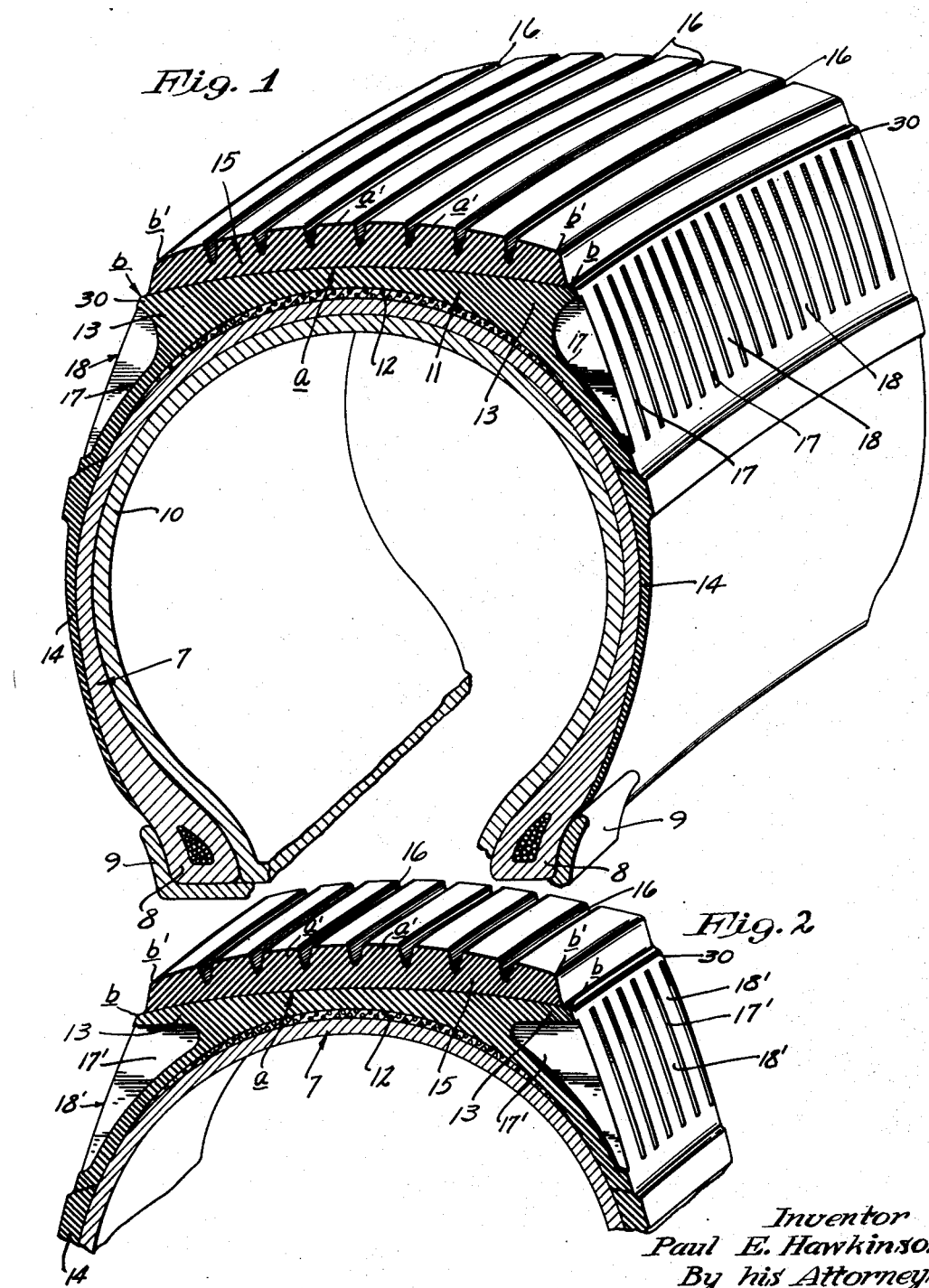
Inventor
Paul E. Hawkinson
By his Attorneys
Merchant & Merchant

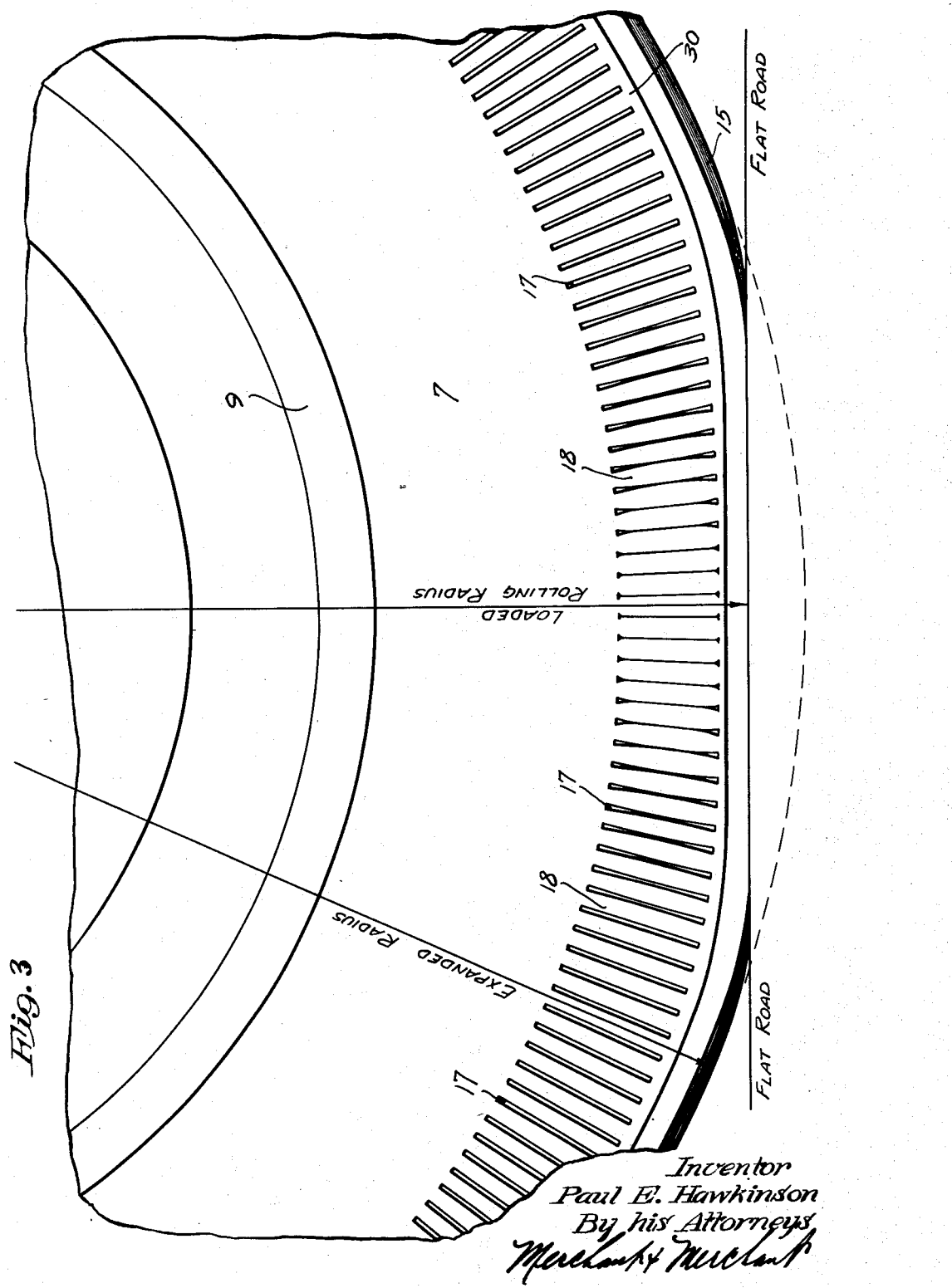

Patented Nov. 24, 1942

2,303,164

UNITED STATES PATENT OFFICE 2,303,164

PNEUMATIC TIRE

Paul E. Hawkinson, Minneapolis, Minn.

Application January 30, 1941, Serial No. 376,606

4 Claims. (Cl. 152—153)

My present invention relates to improvements in pneumatic tires such as are used on automobiles, trucks, and the like.

As is well known, tire casings of the general character above identified comprise mainly a carcass, and a tread overlying the crown portion of the carcass. The carcass of such a tire, which is usually made up of superimposed layers of diagonally disposed cords adhered together but insulated apart by a resilient binder of resilient material such as soft rubber, assumes a substantially arcuate or circular contour in transverse section when the casing is inflated and unrestrained against outward expansion. The tread of such a tire usually has a crown surface that is relatively flat in transverse cross-section as compared to the cross-sectional contour of the underlying portion of the carcass, this being necessary in order to obtain relatively wide contact with the road and for the purpose of transferring the load to a transversely wide area of the carcass, and of course results in a tread that is progressively thicker from its transverse center towards its tranverse edges. These relatively thick tread portions radially inwardly of the laterally spaced edge portions of the crown surface of the tread, and which are commonly referred to in the industry and will herein be referred to as "shoulders" or "shoulder tread portions," have been the source of a great deal of trouble in the tire industry, and it is toward the elimination of trouble at these thick shoulders that this invention is directed.

A few of the faults and troubles common to thick shouldered tires of the prior art are as follows, to wit:

(a) Uneven tread wear over the laterally spaced thick shoulders, often referred to in the art as "cupping" or "button punching";

(b) The generation of excessive heat in these thick shoulders which weakens the carcass and the bond between the thick shoulder portions and carcass and often results in tread separation or carcass failure at these laterally spaced shoulders;

(c) The relative massiveness of the shoulder portions of most tires results in an essentially stiff shoulder that is difficult to flex or bend as the tire bulges laterally under engagement with the ground, and this results in uneven distribution of flexing action in the carcass with the result that "hinge points" are produced in the carcass adjacent the thick stiff shoulders, these hinge points often resulting in premature carcass failure. Furthermore, the massiveness and relative stiffness of the shoulders of most tire treads results in transmission of severe road shocks to the laterally outwardly and radially inwardly sloping portions of the carcass underlying the thick shoulders which tends to pound the shoulders loose from the carcass;

(d) When a tire is placed under load on the road that portion of the tread in flat contact with the road tends to be crowded into a shorter circumferential space than is normally consumed thereby in its circumferentially arcuate shape, and it is this crowding of the tread that produces the now well recognized "tread waves"; tread waves being represented by a bulge in the crown surface of the tread just ahead of the straight line of road contact and being caused by the forward displacement or crowding of tread material under wheel rotation on the road. These tread waves are a primary cause of the damaging heat, above noted, and are one of the main causes of uneven tread wear, such as cupping or button punching above referred to, and tend to pull the tread stock loose from the carcass and, being in the nature of a hard pressed lump, pound and transmit severe shocks to the carcass when they encounter road obstructions, paving joints, and the like. While such tread waves are present throughout the entire width of the crown tread in any tire cured in the ordinary manner, which is while the tire is expanded to approximately its normal cross-sectional shape and radius, the magnitude of these tread waves increases as the thickness and massiveness of the tread stock increases and, hence, the magnitude of these tread waves is greatest and the results thereof most serious at the thick laterally spaced shoulders. In this connection it may be said that separation of the thick shoulder portions of the tread from the carcass and blowing out of the carcass at these points, as a result of severe shocks, undue strains, and excessive heat, are among the most common reasons for the rejection of tire casings by the retreading industry.

In accordance with the present invention I provide a novel construction of these thick shoulder tread portions of a tire, whereby the massiveness of the material may be reduced sufficiently to provide the desired degree of resilience and elasticity to these thick shoulders, while at the same time operating to provide adequate support in these shoulders for those portions of the carcass radially underlying the same at the base of an inflated tire under load, known as the rolling radius of a tire. Tires having these thick shoulder tread portions constructed and in accordance with the teachings hereof have been found to largely overcome all of the objections to previous thick shouldered tires and, hence, to combine the following noted desirable characteristics:

(a) Unusually cool operation of the entire tread and carcass;

(b) Softer riding characteristics due to the added and evenly distributed flexibility of the shoulders;

(c) Unusually even wear of the entire tread surface;

(d) A minimum of resistance to forward rolling action under load;

(e) Increased mileage from both tread and carcass;

(f) A great reduction in the percentage of casings that must be rejected for the purpose of re-capping because of separation between the thick shoulder portions of the tread and the carcass; and (g) A great reduction in the magnitude of the tread wave produced in the thick shoulder portions of the tire and which is believed to be responsible, to a large extent, for the other characteristic advantages above noted.

My improved tire tread construction has the advantage of permitting the use of a wider road-engaging crown tread surface than has hitherto been practical.

While many attempts have hitherto been made toward the reduction of a mass of material in the thick shoulders, in order to give the desired added resilience and elasticity thereto, the results hitherto obtained in this direction have etiher been of very small value, or have resulted in production of shoulders so flimsy as to be of little value in transferring the radial and torque load from the carcass to the road, or have reduced some of the above noted difficulties at the expense of further aggravation of others, so that the net results obtained by all previous attempts in this direction have left much to be desired.

The above and other highly important objects and advantages of the invention will be made apparent from the following specification, claims and appended drawings.

In the accompanying drawings like characters indicate like parts throughout the several views.

Referring to the drawings:

Fig. 1 is a fragmentary perspective view of a tire incorporating one embodiment of the invention;

Fig. 2 is a view substantially similar to Fig. 1 but illustrating a slightly modified shoulder design; and Fig. 3 is a fragmentary view, in side elevation and on a somewhat reduced scale, roughly illustrating the tire of Fig. 1 as it would appear under load on the road.

With reference first to the tire of Figs. 1 and 3, the carcass, which may be assumed to be of the customary character, comprising a plurality of layers of diagonally disposed cords adhered together but insulated apart by a resilient binder of rubber, or the like, is indicated as an entirety by 7. This carcass 7 is provided with the usual reinforced rim-engaging beads 8. In Fig. 1 the beads 8 are shown as being mounted on the conventional type of wheel rim, indicated by 9, and the casing is shown as equipped with a conventional inner tube 10, that may be assumed to be inflated. In this condition it will be noted that the inside of the carcass is substantially arcuate or cylindrical in transverse section. Applied over the crown portion of the carcass 7 is an incomplete or base tread 11 between which and the carcass is interposed the customary breaker strip 12. The crown surface of the base crown tread material 11, indicated by $a$ and extending between points $b$—$b$, has a much greater radius than does the underlying arcuate portion of the carcass which, in turn, results in the crown surface $a$ having a relatively flat contour in transverse cross-section as compared to the transverse contour of the underlying portion of the carcass. Hence, it will be seen that the base tread material 11 is progressively wider from its transverse center toward its laterally spaced edges $b$—$b$, these thick laterally spaced portions of the tread, indicated by 13, being referred to in the tire industry, and being referred to herein as the "shoulders." The sides of these shoulder tread portions 13 are usually tangential to the arcuate side walls of the casing, which side walls radially inwardly of the thick shoulders are provided with a relatively thin layer of side wall protecting material 14 that is usually a rubber composition similar to the tread material.

Applied over the crown surface $a$ of the base tread material 11 is an annular band of road-engaging tread material 15 which may be applied and cured independently of the base tread material 11. The road-engaging crown surface of this outer layer of tread material 15, which is indicated by $a'$ and extends between points $b'$—$b'$, is broken up by a plurality of design-forming recesses 16 and also has a transverse contour that is relatively very flat as compared to the contour of the underlying carcass.

In accordance with the present invention the thick shoulder portions 13 of the base tread 11 are formed with circumferentially spaced recesses 17 which are preferably, and as illustrated, in the nature of radial slots. These circumferentially spaced radial slots 17 preferably extend radially outwardly from the radially inner base portions of the thick shoulders 13, but terminate radially inwardly of the crown surface $a$ of the base tread material. In the preferred embodiments herein illustrated these recesses 17, which are illustrated as being in the nature of radial slots, extend laterally under the crown surface $a$ of the base tread material and, in fact, also extend laterally under the crown surface $a'$ of the road-engaging outer tread material, but terminate radially inwardly of the crown surface $a$ so as to provide a circumferentially complete layer of base tread stock radially between the slots 17 and the crown surface $a$ of the base tread 11. Hence, it will be seen that the circumferentially spaced slots or recesses 17 divide the thick shoulder portions 13 of the base tread material into a circumferentially spaced plurality of radial ribs 18 that are all tied together at their radially outer ends by a continuous unbroken layer of tread stock. By reference to Figs. 1 and 3, it will be further noted that the radial ribs 18 are of materially greater width than the width of the intervening slots, so that throughout the circumferential portion of the tire which rests upon the ground and is deformed by the load which it supports, the ribs 18 will bulge and bear one against the other throughout substantially their entire length, closing the slots 17, and giving the extra supporting strength to the adjacent tread and carcass portions of the tire under rolling radius as would be obtained by a solid shoulder construction.

The tire of Fig. 2 is like the tire of Figs. 1 and 3 with the single exception that the radial slots in the shoulders thereof, indicated by 17', are laterally deeper than the slots or recesses 17 of Figs. 1 and 3 and, hence, divide the thick shoulders into circumferentially spaced rib-like segments 18' that are correspondingly deeper than the rib-like segments 18 of Figs. 1 and 3. Since all other portions of the tire are identical to those of the tire casing of Figs. 1, and 3, such other parts are indicated by like characters. Since the recesses 17' of Fig. 2 extend laterally deeper into the thick shoulders, it will be obvious that a still further degree of elastic resilience and circumferential and radial compressibility will be given to the shoulders 13 of Fig. 2 than is present in the thick shoulders of Figs. 1, and 3; and it will also be evident that the laterally deep recesses 17' of Fig. 2, if formed by heated mold flanges, will result in even a greater degree of unification of the time required to cure these thick shoulders as compared to the time required to cure other and thinner portions of the casing.

While Fig. 3 has been described as a fragmentary side elevation of the form of the invention shown in Fig. 1, and the reference characters corresponding to those used in that figure, attention is directed to the fact that Fig. 3 is equally representative of the modification in Fig. 2 which will give substantially the same appearance under load on the road, i. e., with the slots closed at the base of the tire where under loaded condition of the inflated tire the ribs will bear one against the other and present a functionally solid shoulder construction under rolling radius.

By breaking up the thick shoulders of the tire into circumferentially spaced projections in the manner described, the massiveness of the material in these thick shoulders can be greatly reduced to a variable extent depending upon the spacing and magnitude of the transversely extended slots, so as to provide a desired and variable degree of elastic compressibility in these shoulders both in a radial and circumferential direction. By reference again to Fig. 3, wherein the tire is shown as flattened out on the road under load, and wherein the lines marked "Loaded rolling radius" and "Expanded radius" may be assumed to extend from the axis of the tire casing, it will be seen that a plurality of shoulder ribs 18 either side of the longitudinal center of the flat road contact area have been brought to bear one against the other as a result of circumferential and radial pressure when the tire is flattened out on the road under load. Hence, it will be seen that, by virtue of the reduction of the mass of material in the thick shoulders, in the manner described, the remaining material in these thick shoulders is given freedom to flow, under radial and circumferential pressure, to a pre-determined extent, and that the shoulders become relatively much more resistant to radial and circumferential compression as the slots 17 close and the adjacent ribs 18 come to bear one against the other. In other words, by varying the magnitude and spacing of the slots 17, the shoulders can be made to have a desired degree of elasticity to radial and circumferential pressure and then to rapidly build up a desired degree of resistance to circumferential and radial pressure after a pre-determined amount of load has been applied thereto. Of course, the resistance of the thick shoulder material to radial and circumferential pressure, and the resultant load-supporting ability thereof, will progressively build up very rapidly as the slots or open areas of the shoulders close by flow of material thereinto, i. e., the bulging of the ribs into substantially abutting relation.

Because of the fact that the radial ribs 18 are all tied together at their outer ends, it will not always be necessary, or even desirable, particularly in lighter types of service, to have the shoulder open areas or slots closed or the ribs actually come to bear, one against the other, under any load condition encountered in normal use. However, for some types of service, and particularly for heavy service, it will often be highly advantageous to so design the shoulders that the adjacent shoulder ribs or solid portions will flow into and largely or even entirely close the intervening slots or open areas under a predetermined reduction in radius has taken place under load on the road. In Fig. 3 this latter condition is illustrated as having been brought about to a very marked degree by the time the radius of the tire has been reduced to its normal "loaded rolling radius," but in some instances, it may not be necessary to have the ribs begin to bear against and support one another until a still further radial reduction has been brought about.

Of course, the forming of the thick shoulders in the manner described largely eliminates the production of excessive tread waves in these thick shoulders, and when the tread is cured in two operations with the outer road-engaging tread cured to a radially and circumferentially contracted condition wherein all points about its circumference have a radius approximating that of the normal rolling radius of the casing, there will be substantially no tendency to produce tread waves in the outer road-engaging tread.

What I claim is:

1. In a pneumatic tire casing having a carcass that is substantially arcuate cross-sectionally when the tire is inflated and unrestrained against outward expansion, and an annular crown tread applied over the crown portion of the carcass, said crown tread having a crown surface with a cross-sectional contour that is relatively very flat as compared to the cross-sectional contour of the underlying portion of the carcass, whereby the crown tread is progressively thicker from its transverse center to its laterally spaced opposite edges and forms relatively very thick annular shoulder tread portions radially inwardly of its laterally spaced edge portions, the sides of the said thick shoulder portions having a circumferentially spaced series of outwardly extending slots and intervening ribs that are of materially greater width than the slots, said slots terminating radially inwardly of the crown surface of the crown tread, and the relation between the width of the slots and the width of the intervening ribs being such that adjacent ribs will be brought to bear one against the other throughout the greater portion of their length when the crown surface of the tire is reduced to its minimum loaded rolling radius encountered under conditions of use.

2. In a pneumatic tire casing having a carcass that is substantially arcuate cross-sectionally when the tire is inflated and unrestrained against outward expansion, an annular crown tread applied over the crown portion of the carcass, said crown tread having a crown surface with a cross-sectional contour that is relatively very flat as compared to the cross-sectional contour of the underlying portion of the carcass, whereby the crown tread is progressively thicker from its transverse center to its laterally spaced opposite edges and forms relatively very thick annular shoulder tread portions radially inwardly of its laterally spaced edge portions, the sides of the said thick shoulder portions being formed to provide a circumferentially spaced series of outwardly extending slots and intervening ribs that are of materially greater width than the slots, said slots being substantially equally spaced about the circumference of the casing and terminating radially inwardly of the crown surface of the crown tread, and the relation between the width of the slots and the width of the intervening ribs being such that adjacent ribs will be brought to bear, one against the other, when the crown surface of the tire is reduced to its minimum loaded rolling radius encountered under conditions of use.

3. In a pneumatic tire casing having a carcass that is substantially arcuate cross-sectionally when the tire is inflated and unrestrained against outward expansion, and annular crown tread applied over the crown portion of the carcass, said crown tread having a crown surface with a cross-sectional contour that is relatively very flat as compared to the cross-sectional contour of the underlying portion of the carcass, whereby the crown tread is progressively thicker from its transverse center to its laterally spaced opposite edges and forms relatively very thick annular shoulder tread portions radially inwardly of its laterally spaced edge portions, the sides of the said thick shoulder portions being formed to provide a circumferentially spaced series of outwardly extending slots and intervening ribs that are of materially greater width than the slots, said slots terminating radially inwardly of the crown surface of the crown tread and against a circumferentially continuous layer of tread stock having a minimum transverse width at least equal to the maximum width of the crown surface of the tread, the relation between the circumferential width of the slots and the circumferential width of the intervening ribs being such that adjacent ribs will be brought to bear, one against the other, when the crown surface of the tread is reduced to its minimum loaded rolling radius encountered under conditions of use.

4. The structure defined in claim 1 in which all of the said slots are substantially equally spaced about the entire circumference of the tire and in which the circumferential width of the ribs and slots is such that a plurality of adjacent ribs radially over that portion of the tread in flat contact with the road will be brought to bear progressively one against the other as a result of radial and circumferential pressure on the ribs when the tread is reduced to its minimum loaded rolling radius at the center of the flat road contact line under conditions of use.

PAUL E. HAWKINSON.